United States Patent
Kubota (10) Patent No.: US 9,575,713 B2
(45) Date of Patent: Feb. 21, 2017

(54) INFORMATION PROCESSING DEVICE, INFORMATION PROCESSING METHOD, AND PROGRAM

(71) Applicant: Seiko Epson Corporation, Tokyo (JP)

(72) Inventor: Mitsuru Kubota, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 36 days.

(21) Appl. No.: 14/665,044

(22) Filed: Mar. 23, 2015

(65) Prior Publication Data

US 2015/0277844 A1    Oct. 1, 2015

(30) Foreign Application Priority Data

Mar. 28, 2014  (JP) ................... 2014-068252
Aug. 28, 2014  (JP) ................... 2014-173626

(51) Int. Cl.
*G06F 3/14* (2006.01)
*G09G 5/12* (2006.01)
*H04N 9/31* (2006.01)

(52) U.S. Cl.
CPC .............. *G06F 3/1454* (2013.01); *G09G 5/12* (2013.01); *H04N 9/3179* (2013.01); *G09G 2350/00* (2013.01)

(58) Field of Classification Search
CPC ..... G06F 3/1454; G09G 2350/00; G09G 5/12; H04N 9/3179
See application file for complete search history.

(56) References Cited

U.S. PATENT DOCUMENTS

| 7,626,734 | B2 | 12/2009 | Nobori | |
|---|---|---|---|---|
| 2009/0043846 | A1 | 2/2009 | Inoue | |
| 2009/0153751 | A1* | 6/2009 | Asakura | G06F 3/1454 348/744 |
| 2011/0122147 | A1* | 5/2011 | Yasukawa | G09G 5/003 345/589 |

FOREIGN PATENT DOCUMENTS

| JP | 6-110425 A | 4/1994 |
|---|---|---|
| JP | 2005-258291 A | 9/2005 |
| JP | 4049115 B | 2/2008 |
| JP | 2009-044328 A | 2/2009 |

* cited by examiner

*Primary Examiner* — Kenneth Bukowski
(74) *Attorney, Agent, or Firm* — ALG Intellectual Property, LLC (57) ABSTRACT

An information processing device includes: a communication unit which communicates with a plurality of terminals, each outputting a video signal; a first acquisition unit which acquires a first preview image from at least a part of the plurality of terminals; a second acquisition unit which acquires a second preview image having a larger display area size than the first preview image, from a designated terminal of the plurality of terminals; and a display control unit which causes a display unit to display the first preview image and the second preview image on a single screen. A frequency at which the second acquisition unit acquires the second preview image is higher than a frequency at which the first acquisition unit acquires the first preview image.

10 Claims, 6 Drawing Sheets

INFORMATION PROCESSING DEVICE, INFORMATION PROCESSING METHOD, AND PROGRAM

CROSS-REFERENCE TO RELATED APPLICATION

The entire disclosure of Japanese Patent Application No. 2014-068252, filed Mar. 28, 2014 and Japanese Patent Application No. 2014-173626, filed Aug. 28, 2014 are expressly incorporated by reference herein.

BACKGROUND

1. Technical Field

The present invention relates to an information processing device, an information processing method, and a program.

2. Related Art

A system in which a single projector is made to simultaneously project video signals outputted from a plurality of computers is known. With respect to this system, JP-A-6-110425 discloses a device which, when outputting a plurality of video signals from a video signal supply unit, provides a VTR selection area and a preview screen display area on an input display board on a screen, then carries out selection and operation, and displays a video signal selected by controlling the video signal supply unit, in the preview screen area. Japanese Patent No. 4049115 discloses a projector which selects an image input interface terminal to which desired image information is inputted, from among image input interface terminals, and projects the desired image information.

According to the techniques of JP-A-6-110425 and Japanese Patent No. 4049115, in the case where a large number of computers are connected, preview display of video signals from a plurality of computers may increase the network load.

SUMMARY

An advantage of some aspects of the invention is that the communication load at the time of preview display of video signals from a plurality of computers is reduced.

An aspect of the invention is directed to an information processing device including: a communication unit which communicates with a plurality of terminals, each outputting a video signal; a first acquisition unit which acquires a first preview image from at least a part of the plurality of terminals; a second acquisition unit which acquires a second preview image having a larger display area size than the first preview image, from a designated terminal of the plurality of terminals; and a display control unit which causes a display unit to display the first preview image and the second preview image on a single screen. A frequency at which the second acquisition unit acquires the second preview image is higher than a frequency at which the first acquisition unit acquires the first preview image. According to this information processing device, the communication load at the time of preview display of video signals from the plurality of terminals is reduced, compared with the case where the frequency of acquiring the second preview image is not higher than the frequency of acquiring the first preview image.

In a preferable aspect of the invention, with respect to one terminal of the plurality of terminals, if a newly acquired first preview image has smaller change than a reference level, compared with a previously acquired first preview image, the frequency at which the first acquisition unit acquires the first preview image falls. According to this information processing device, the communication load at the time of preview display of video signals from the plurality of terminals is reduced, compared with the case where the frequency of acquiring the first preview image does not fall if a newly acquired first preview image has smaller change than a reference level, compared with a previously acquired first preview image.

In another preferable aspect of the invention, the frequency at which the first acquisition unit acquires the first preview image is a predetermined interval, and the frequency at which the first acquisition unit acquires the first preview image is lowered by elongating the predetermined interval. According to this information processing device, the timing of acquiring the first preview image can be managed more easily than in the case where a measure for elongating the predetermined interval is not used to lower the frequency at which the first acquisition unit acquires the first preview image.

In another preferable aspect of the invention, with respect to one terminal of the plurality of terminals, if a newly acquired first preview image has larger change than a reference level, compared with a previously acquired first preview image, the frequency at which the first acquisition unit acquires the first preview image rises. According to this information processing device, the real-time property of the first preview image to be displayed is enhanced, compared with the case where the frequency of acquiring the first preview image does not rise if a newly acquired first preview image has larger change than a reference level, compared with a previously acquired first preview image.

In another preferable aspect of the invention, the frequency at which the first acquisition unit acquires the first preview image is a predetermined interval, and the frequency at which the first acquisition unit acquires the first preview image is raised by shortening the predetermined interval. According to this information processing device, the timing of acquiring the first preview image can be managed more easily than in the case where a measure for shortening the predetermined interval is not used to raise the frequency at which the first acquisition unit acquires the first preview image.

In another preferable aspect of the invention, the first acquisition unit does not acquire the first preview image from a terminal from which the second acquisition unit acquires the second preview image. According to this information processing device, the communication load is reduced, compared with the case where the first preview image is acquired also from a terminal from which the second preview image is acquired.

In another preferable aspect of the invention, the information processing device further includes a command unit which commands the plurality of terminals to update the first preview image and the second preview image, and a frequency at which the command unit commands update of the second preview image is higher than a frequency at which the command unit commands update of the first preview image. According to this information processing device, the communication load at the time of preview display of video signals from the plurality of terminals is reduced, compared with the case where the frequency of commanding the update of the second preview image is not higher than the frequency of commanding the update of the first preview image.

In another preferable aspect of the invention, the information processing device further includes a command unit which gives a command about an update frequency of the first preview image and the second preview image, to the plurality of terminals. According to this information processing device, the communication load at the time of preview display of video signals from the plurality of terminals is reduced, compared with the case where the frequency of acquiring the second preview image is not higher than the frequency of acquiring the first preview image.

In another preferable aspect of the invention, in the case of acquiring the first preview image from at least two or more terminals of the plurality of terminals, the first acquisition unit varies the timing of acquiring the first preview image from the at least two or more terminals. According to this information processing device, the real-time property of the first preview image to be displayed is enhanced, compared with the case where the timing of acquiring the first preview image is not varied.

Another aspect of the invention is directed to an information processing method including: communicating with a plurality of terminals, each outputting a video signal; acquiring a first preview image from at least a part of the plurality of terminals; acquiring a second preview image having a larger display area size than the first preview image, from a designated terminal of the plurality of terminals; and causing a display unit to display the first preview image and the second preview image on a single screen. A frequency of executing the acquisition of the second preview image is higher than a frequency of executing the acquisition of the first preview image. According to this information processing method, the communication load at the time of preview display of video signals from the plurality of terminals is reduced, compared with the case where the frequency of acquiring the second preview image is not higher than the frequency of acquiring the first preview image.

Still another aspect of the invention is directed to a program which causes a computer to execute: communicating with a plurality of terminals, each outputting a video signal; acquiring a first preview image from at least a part of the plurality of terminals; acquiring a second preview image having a larger display area size than the first preview image, from a designated terminal of the plurality of terminals; and causing a display unit to display the first preview image and the second preview image on a single screen. A frequency of executing the acquisition of the second preview image is higher than a frequency of executing the acquisition of the first preview image. According to this program, the communication load at the time of preview display of video signals from the plurality of terminals is reduced, compared with the case where the frequency of acquiring the second preview image is not higher than the frequency of acquiring the first preview image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
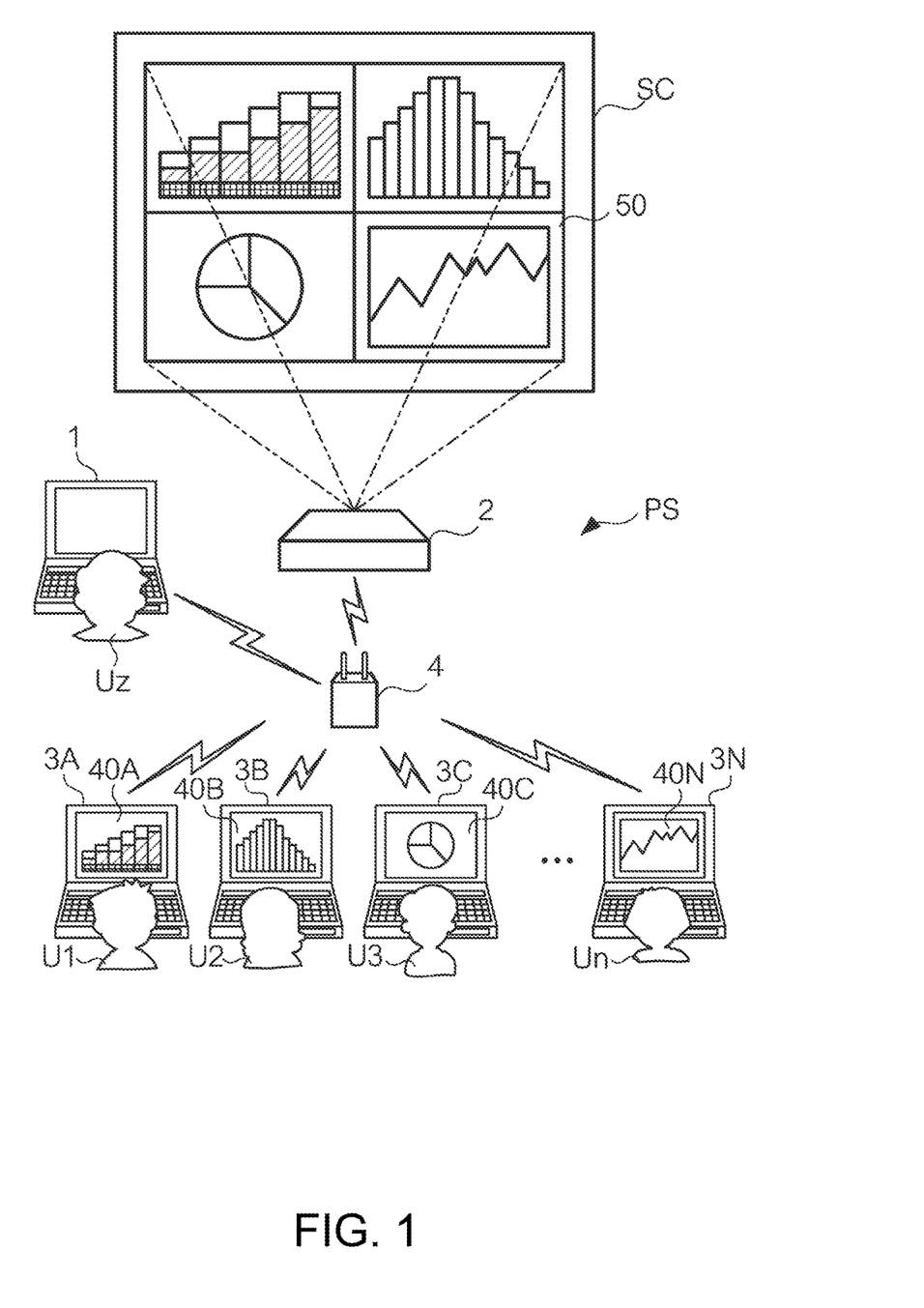
FIG. 1 is a schematic view of a projection system PS.

FIG. 1 is a schematic view of a projection system PS according to an embodiment of the invention. The projection system PS has a personal computer 1, a projector 2, and a plurality of personal computers 3 (3A to 3N). The personal computer 1 (hereinafter referred to as "PC 1") is an information processing device which carries out display of a preview image of a video signal projected by the projector 2 and designation of a layout of the video signal. In this example, the PC 1 is used by a user Uz who is the moderator of a conference held with the use of the projection system PS. The personal computer (hereinafter referred to as "PC 3") is an information processing device (terminal) which outputs a video signal to the projector 2. In this example, the PC 3A to the PC 3N are used by users U1 to Un who are the participants of the conference held with the user of the projection system PS. The PC 1 and the PCs 3 are wirelessly connected to the projector 2 via an access point 4. The projector 2 is an image display device which projects an image represented by a video signal to a screen SC. The projector 2 projects an image corresponding to a video signal supplied from at least one PC 3 of the plurality of PCs 3, to the screen SC. If video signals are outputted from the plurality of PCs 3, the projector 2 projects a single image (hereinafter referred to as a "combined image") formed by combining images (hereinafter referred to as "individual images") corresponding to the video signals outputted from the respective PCs 3, to the screen SC. In the example of FIG. 1, the projector 2 projects a combined image 50 formed by combining individual images 40 (40A to 40C and 40N) from the PCs 3A, 3B, 3C and 3N, to the screen SC.

Figure 2:
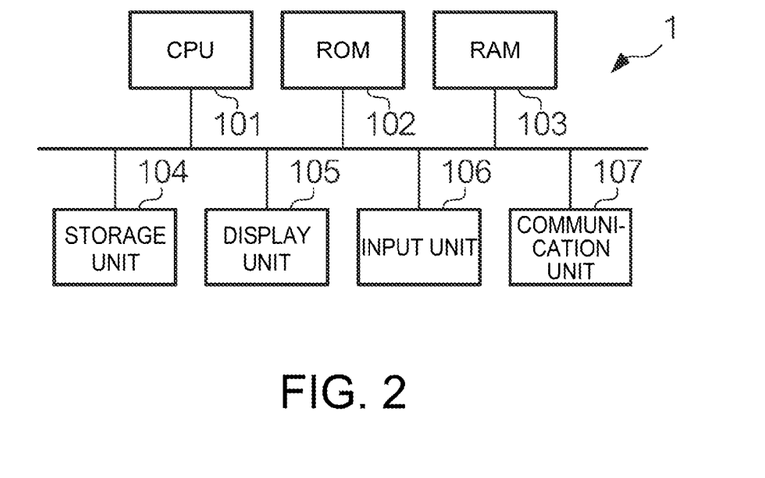
FIG. 2 is a block diagram showing the hardware configuration of a PC.

FIG. 2 is a block diagram showing the hardware configuration of the PC 1. The PC 1 is a computer having a CPU (central processing unit) 101, a ROM (read only memory) 102, a RAM (random access memory) 103, a storage unit 104, a display unit 105, an input unit 106, and a communication unit 107. The CPU 101 is a device which executes a program and thus controls each part of the PC 1. The ROM 102 is a non-volatile storage device in which various programs and data are stored. The RAM 103 is a volatile storage device which stores data. The storage unit 104 is a storage device which stores data and programs, for example, an HDD (hard disk drive). The display unit 105 has a display device such as a liquid crystal display or organic EL (electroluminescence) display or the like. The input unit 106 is a device for accepting an operation input by the user Uz, and includes a keyboard, a mouse, and various buttons. The communication unit 107 communicates with an external device such as the PC 3 or the projector 2 or the like. Although detailed explanation of the hardware configuration of the PC 3 is omitted, the PC 3 has a similar configuration to the PC 1 and is an information processing device having a CPU, a ROM, a RAM, a storage unit, a display unit, an input unit, and a communication unit.

Figure 3:
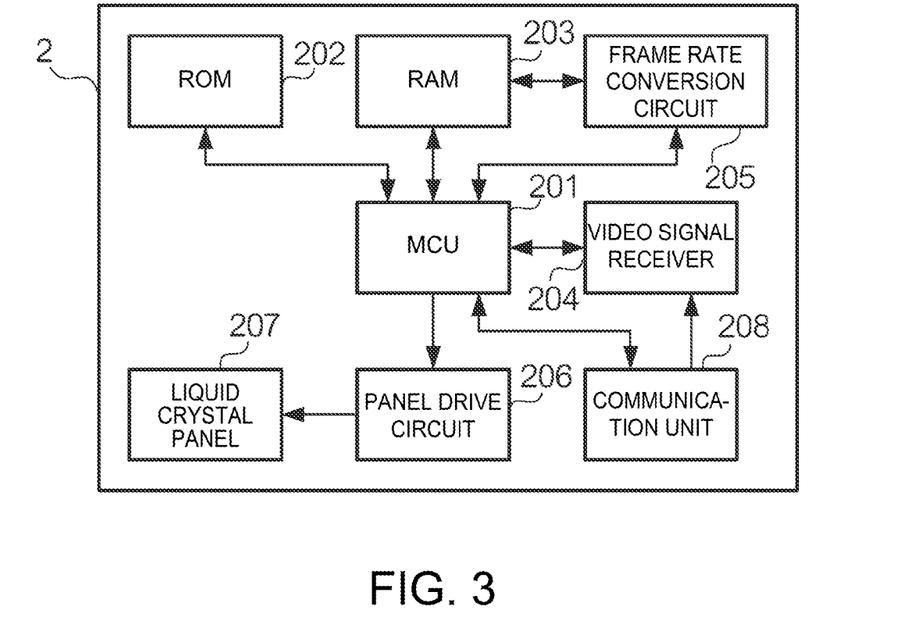
FIG. 3 is a block diagram showing the hardware configuration of a projector.

FIG. 3 is a block diagram showing the hardware configuration of the projector 2. The projector 2 has an MCU (micro control unit) 201, a ROM 202, a RAM 203, a video signal receiver 204, a frame rate conversion circuit 205, a panel drive circuit 206, a liquid crystal panel 207, and a communication unit 208. The MCU 201 is a device which executes a program and thus controls each part of the projector 2. The ROM 202 is a non-volatile storage device in which various programs and data are stored. The RAM 203 is a volatile storage device which stores data. The RAM 203 has a frame memory for storing data representing an image of one frame.

The video signal receiver 204 acquires a video signal from the PC 1 and the PC 3 via the communication unit 208. The MCU 201 stores the video signal acquired by the video signal receiver 204, in the frame memory of the RAM 203 as an image of one frame each. In the case where the video signal receiver 204 acquires a video signal from a plurality of PCs 3, the MCU 201 generates a combined image 50 and stores the combined image 50 in the frame memory. The frame rate conversion circuit 205 converts the frame rate of the video signal in such away that the number of times the image display is switched per second matches with the frame rate of the projector 2. The MCU 201 enlarges or reduces the image stored in the frame memory, according to the resolution of the liquid crystal panel 207. The MCU 201 writes the enlarged or reduced image in the frame memory. The panel drive circuit 206 generates a panel drive signal for driving the liquid crystal panel 207, on the basis of the image read out from the frame memory. The panel drive circuit 206 outputs the panel drive signal to the liquid crystal panel 207.

The liquid crystal panel 207 has a plurality of pixels arranged in the form of a matrix. The liquid crystal panel 207 is used as a light valve for modulating the transmittance of light radiated from a light source, not shown, for each pixel on the basis of the panel drive signal. The light modulated by the liquid crystal panel 207 is enlarged by a lens, not shown, and projected on the screen SC. The communication unit 208 wirelessly communicates with the PC 1 and the PC 3 via the access point 4.

Figure 4:
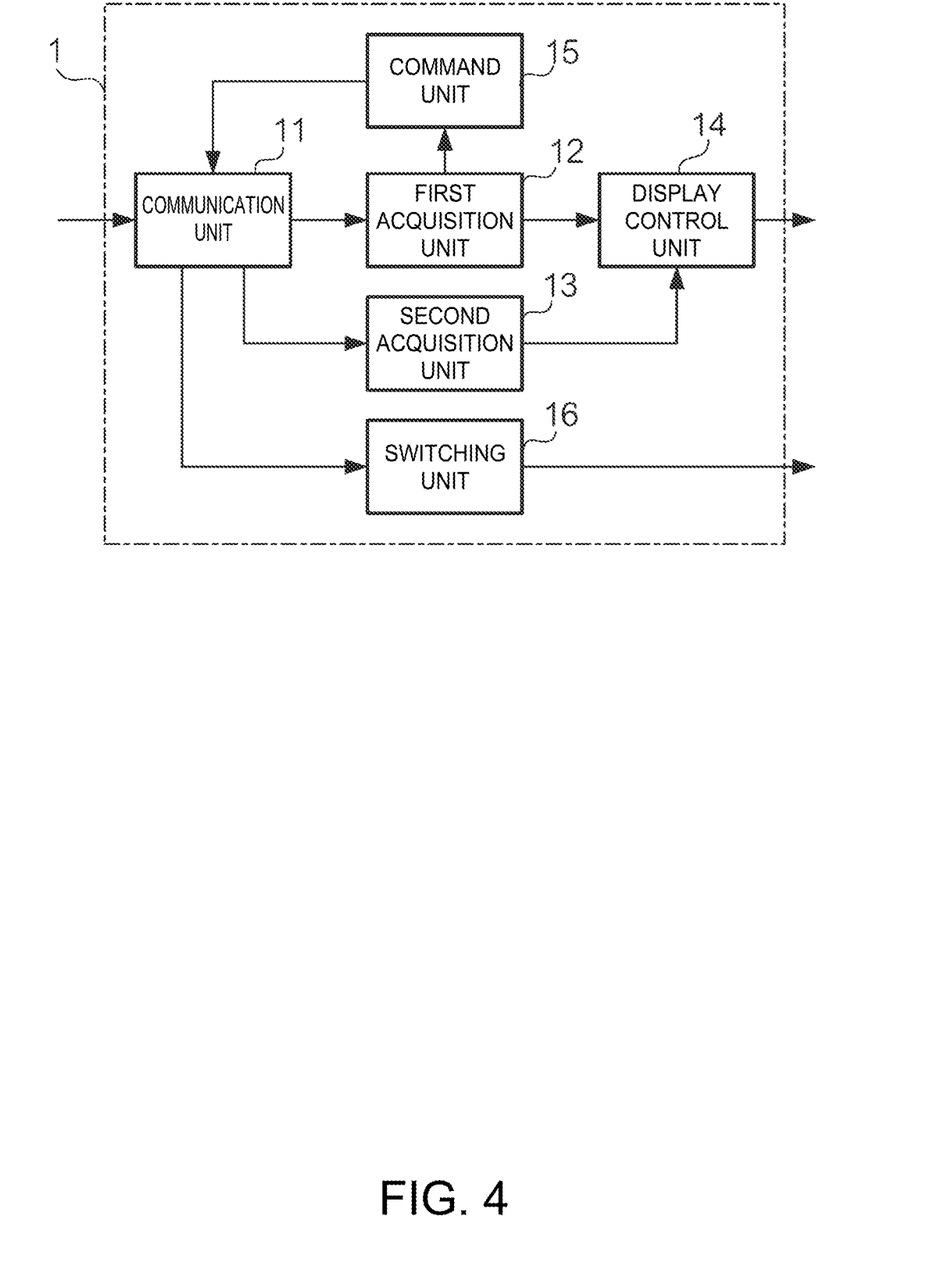
FIG. 4 is a block diagram showing the functional configuration of the PC.

FIG. 4 is a block diagram showing the functional configuration of the PC 1. The PC 1 has a communication unit 11, a first acquisition unit 12, a second acquisition unit 13, a display control unit 14, a command unit 15, and a switching unit 16. The communication unit 11 communicates with a plurality of PCs 3, each outputting a video signal. The first acquisition unit 12 acquires a first preview image from at least a part of the plurality of PCs 3. The second acquisition unit 13 acquires a second preview image having a larger display area size than the first preview image, from a designated PC 3 of the plurality of PCs 3. The display control unit 14 causes a display unit to display the first preview image and the second preview image on a single screen. The command unit 15 commands the plurality of PCs 3 to update the first preview image and the second preview image. The frequency at which the command unit 15 commands the update of the second preview image is higher than the frequency at which the command unit 15 commands the update of the first preview image. The switching unit 16 switches the video displayed on the display unit, to a video displayed according to a video signal outputted from one PC 3 selected from the plurality of PCs 3.

The second acquisition unit 13 may use the image data acquired from the PC 3 for the first preview image, as the second preview image. The first acquisition unit 12 may use the image data acquired from the PC 3 for the second preview image, as the first preview image.

In the PC 1, the communication unit 107 controlled by the CPU 101 executing a program is an example of the communication unit 11. The CPU 101 executing a program is an example of the first acquisition unit 12, the second acquisition unit 13, the display control unit 14, the command unit 15 and the switching unit 16.

Figure 5:
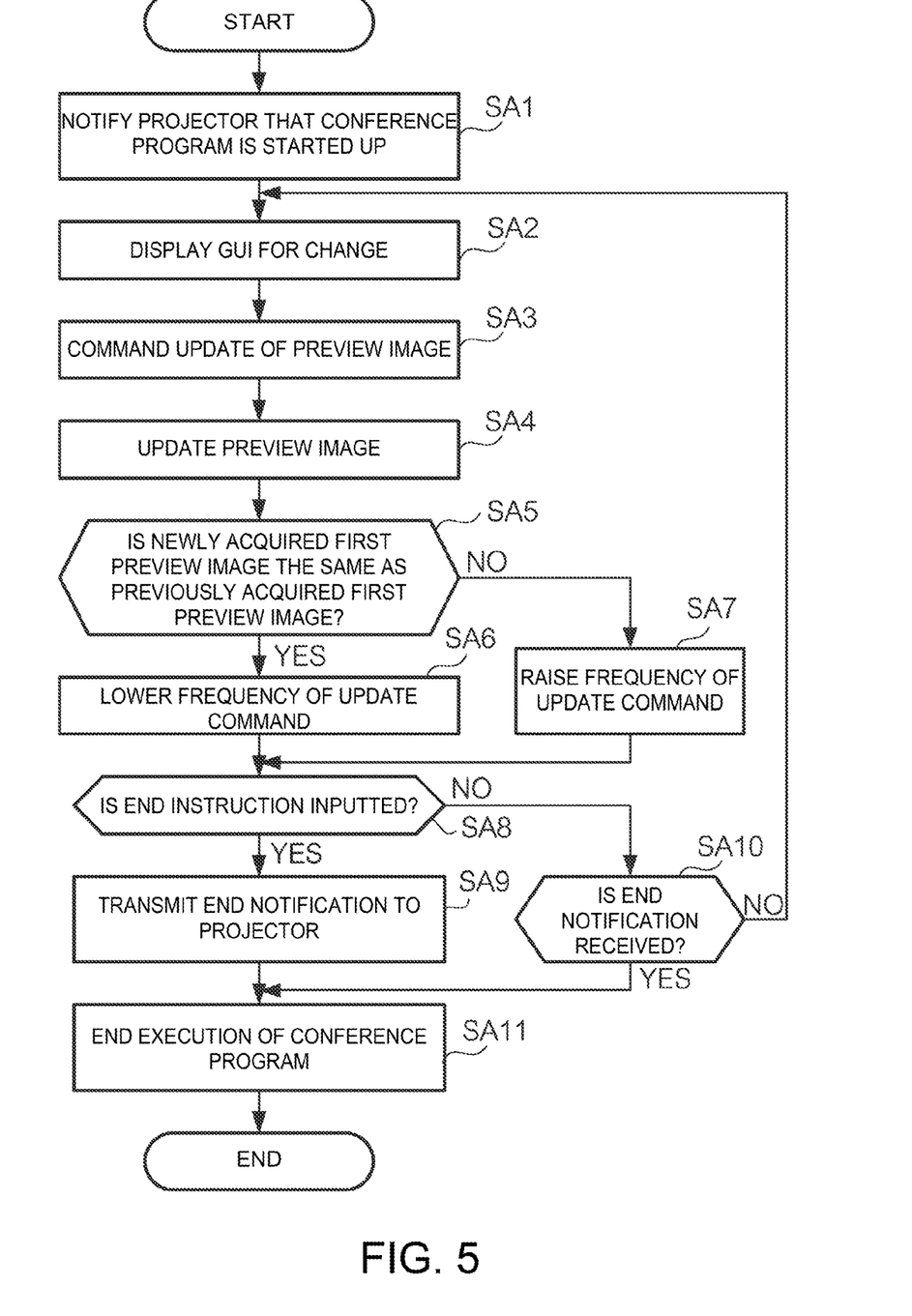
FIG. 5 is a flowchart showing the processing by the PC.

FIG. 5 is a flowchart showing the processing by the PC 1. In the example below, the projection system PS is used for a conference with a plurality of users. The PC 1 executes a program (hereinafter referred to as a "conference program") for displaying a preview image of a video signal outputted from the PC 3 to the projector 2 and for designating a layout of the video signal. The video signal outputted from the PC 3 to the projector 2 is a signal representing dynamic image data with a predetermined frame rate. The following processing is started, for example, triggered by the startup of the conference program in the PC 1 in the state where the PC 1 and the projector 2 are wirelessly connected together.

The CPU 101 notifies the projector 2 that the conference program is started up. In this example, the projector 2 manages the PC 1 in which the conference program is started up. For this management, the projector 2 is notified of the startup of the conference program. In Step SA2, the CPU 101 displays a GUI for change in a superimposed manner on image displayed on the display unit 105. Specifically, the CPU 101 generates an image showing a GUI for change on the basis of information representing the layout of the combined image (hereinafter referred to as "layout information"), and displays this image in a superimposed manner on an image displayed on the display unit 105. The projector 2 distributes the layout information to the PC 1 at predetermined timing. The PC 1 stores the layout information distributed from the projector 2 and generates the image showing the GUI for change on the basis of this layout information.

Figure 6:
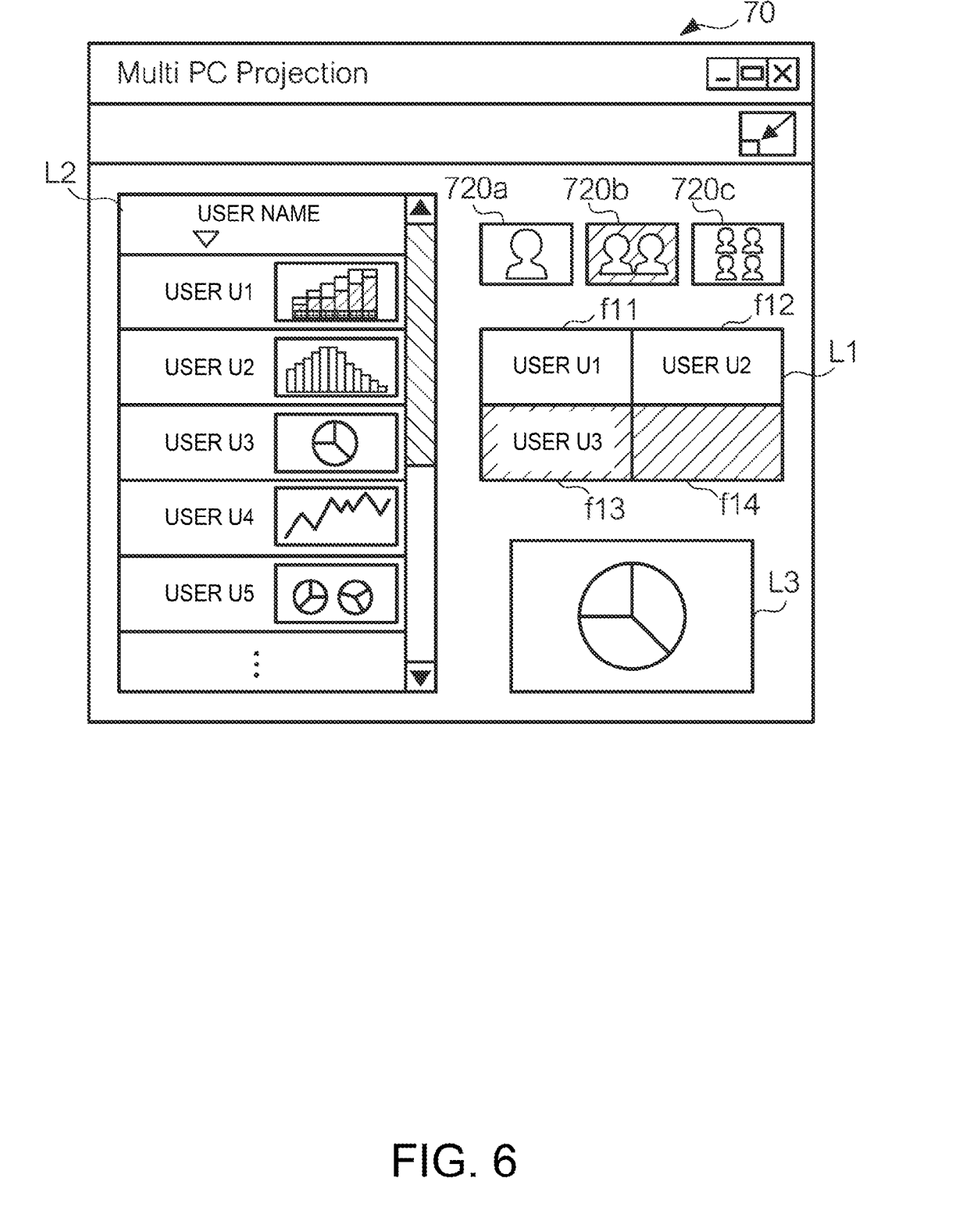
FIG. 6 illustrates an image showing a GUI for change.

FIG. 6 illustrates an image showing a GUI for change. A GUI for change 70 has number of images change buttons 720 (720a to 720c), a layout area L1, a list display area L2, and a preview area L3. The number of images change buttons 720 are buttons for changing the number of individual images 40 projected on the screen SC. A click on the number of images change button 720a changes the number of individual images 40 projected on the screen SC, to one. A click on the number of images change button 720b changes the number of individual images 40 projected on the screen SC, to two. A click on the number of images change button 720c changes the number of individual images 40 projected on the screen SC, to four. In FIG. 6, the number of images change button 720 with the background shaded represents the number of images change button 720 that is currently selected. In the above Step SA2, the CPU 101 selects one number of images change button 720 indicating the number of individual images 40 included in the combined image 50, from among the plurality of number of images change buttons 720. The information indicating the number of individual images 40 included in the combined image 50 (hereinafter referred to as "number of images information") is included in the layout information.

The layout area L1 is an area where the layout of the individual images 40 in the combined image 50 is shown.

The layout area L1 is divided into a predetermined number of areas. In the example shown in FIG. 6, the layout area L1 has division areas corresponding to the maximum number of individual images 40 included in the combined image 50 (in this example, four division areas f1 (f11 to f14) in two rows by two columns). In this example, the maximum number of individual images 40 included in the combined image 50 is set in advance by the conference program. To each division area f1, the corresponding PC 3 is allocated and the identifier of the PC 3 (in this example, the user name of the PC 3) is displayed. In the layout area L1, a division area f1 corresponding to a PC 3 having its individual image 40 projected on the screen SC (hereinafter referred to as an "active PC"), and a division area f1 corresponding to a PC 3 that is not an active PC (referred to as a "non-active PC") are displayed differently. In the example shown in FIG. 6, a division area f1 corresponding to an active PC 3 is displayed with a white background, and a division area f1 corresponding to a non-active PC 3 is displayed with a shaded background. That is, the PC 3A and the PC 3B used by the user U1 and the user U2 are active PCs (the individual images 40 of the PC 3A and the PC 3B are actually projected on the screen SC). Meanwhile, the PC 3C used by the user U3 is a non-active PC (the individual image 40 of the PC 3C is not projected on the screen SC).

The list display area L2 is an area that presents information used to change the correspondence between the division areas f1 and the PCs 3. In the list display area L2, a list (hereinafter referred to as a "connected PC list") of the identifiers of the PCs 3 wirelessly connected to the PC 1 and the preview images of the PCs 3 (first preview image) is displayed. The connected PC list is included in the layout information. In the example of FIG. 6, the user names of the users U1 to the user Un, and the preview images of the images displayed on the PCs 3 corresponding to the respective users are displayed in the list display area L2. To change the correspondence between the division areas f1 and the PCs 3, for example, the user Uz operates the mouse to drag the identifier displayed in the list display area L2 (move the mouse while pressing a mouse button) and then drop the identifier in the layout area L1 (release the mouse button). For example, in the case where the user U4 displayed in the list display area L2 is dragged and dropped in the division area f14, the CPU 101 determines that an instruction to establish a correspondence between the PC 3D and the division area f14 is inputted, and therefore establishes a correspondence between the PC 3D with the division area f14. As a result of establishing this correspondence, the user U4 is displayed in the division area f14.

To display and update the first preview image, an acquisition request (update command) for the first preview image is transmitted from the PC 1 to the PC 3, and the first preview image is transmitted from the PC 3.

The preview area L3 is an area that presents the preview image of one PC 3 designated from among the plurality of PCs 3 (second preview image). To designate the second preview image to be displayed in the preview area L3, for example, the user Uz operates the mouse to drag the identifier displayed in the list display area L2 and then drop the identifier in the preview area L3. For example, in the case where the user Uz drags the user U4 displayed in the list display area L2 and drops the user U4 in the preview area L3, the CPU 101 displays the preview image of the PC 3D in the preview area L3.

To display the second preview image, as in the case of displaying the first preview image, an acquisition request (update command) for the second preview image is transmitted from the PC 1 to the PC 3, and the second preview image is transmitted from the PC 3. In this example, the transmission interval of the update command for the second preview image is shorter than the transmission interval of the update command for the first preview image. The preview area L3, where the second preview image is displayed, is larger than the area where each of the first preview images displayed in the list display area L2 is displayed. The user Uz checks the second preview image displayed in the preview area L3 and determines whether to select the second preview image as a video to be projected by the projector 2. If this image is selected, an operation to drag and drop the user ID corresponding to the second preview image displayed in the preview area L3 into the layout area L1 is performed, thus causing the projector 2 to project the selected video.

Back to FIG. 5, in Step SA3, the CPU 101 commands the plurality of PCs 3 to update the first preview image and the second preview image. The command to update the first preview image is transmitted to the PCs 3 of the identification numbers displayed in the list display area L2. The command to update the second preview image is transmitted to the PC 3 designated by the user Uz using the input unit 106. At this point, the CPU 101 makes the frequency of commanding the update of the second preview image higher than the frequency of commanding the update of the first preview image. Specifically, the CPU 101 may command the update of the first preview image every five seconds and command the update of the second preview image every second.

The CPU 101 may not command the update of the first preview image to the PC 3 commanded to update the second preview image. The CPU 101 displays the image data of the second preview image received from this PC 3, in a reduced size in the list display area L2 as the first preview image.

In Step SA4, the CPU 101 receives (acquires) the first preview image from one PC 3 or a plurality of PCs 3 and also receives (acquires) the second preview image from the PC 3 designated by the user Uz. The CPU 101 also updates the first preview image displayed in the list display area L2, with the first preview image received from the PC 3. The CPU 101 also updates the second preview image displayed in the preview area L3, with the second preview image received from the PC 3. That is, the screen of the GUI for change displayed on the display unit 105 of the PC 1 is updated every time the first preview image or the second preview image is acquired from the PC 3.

In Step SA5, the CPU 101 determines whether or not the newly acquired first preview image has smaller change than a reference level, compared with the previously acquired first preview image. In this example, the CPU 101 determines whether the newly acquired first preview image is the same as the previously acquired first preview image or not. For example, the CPU 101 may compare the new and previous first preview images and determine that these first preview images are the same if pixels having the same gradation level exist at the rate of a predetermined threshold (for example, 90%) or above. If these first preview images are determined as the same in Step SA5 (Step SA5: YES), the CPU 101 proceeds to the processing of Step SA6. In Step SA6, the CPU 101 lowers the frequency of the update command for the first preview image. In this example, the transmission interval of the acquisition request is changed, thereby changing the update interval of the first preview image. For example, the CPU 101 may double the transmission interval of the update command for the first preview image. Specifically, the CPU 101 may change the transmission interval of the update command for the first preview image from five seconds to ten seconds. Meanwhile, if the first preview images are determined as not the same in Step SA5 (Step SA5: NO), the CPU 101 proceeds to the processing of Step SA7. In Step SA7, the CPU 101 raises the frequency of the update command for the first preview image. For example, the CPU 101 may halve the transmission interval of the update command for the first preview image. Specifically, the CPU 101 may change the transmission interval of the update command for the first preview image from five seconds to 2.5 seconds.

In Step SA8, the CPU 101 determines whether an instruction to end the conference (hereinafter referred to as an "end instruction") is inputted or not. The end instruction is inputted, for example, by a click on an end button displayed on a different GUI from the GUI for change in the conference program. If it is determined that an end instruction is inputted (Step SA8: YES), the CPU 101 shifts the processing to Step SA9. If it is determined that an end instruction is not inputted (Step SA8: NO), the CPU 101 shifts the processing to Step SA10.

In Step SA9, the CPU 101 transmits a notification indicating an end instruction (referred to as an "end notification") to the projector 2. In Step SA10, the CPU 101 determines whether an end notification is received from the projector 2 or not. In this example, control is performed in such a way that the conference program is ended in the PC 1 and all the PCs 3 if an end instruction is inputted from the PC 1. As an end instruction is inputted from the PC 1, the projector 2 distributes an end notification to the PCs 3 and causes the conference program to end. If it is determined that an end notification is received (Step SA10: YES), the CPU 101 shifts the processing to Step SA11. If it is determined that an end notification is not received (Step SA10: NO), the CPU 101 shifts the processing to Step SA2. The CPU 101 causes the execution of the conference program to end in Step SA11. As the execution of the conference program ends, the display of the GUI for change and the output of the video signals are stopped.

The projector 2 performs processing to generate a combined image based on the video signals supplied from the PC 1 and project the generated combined image onto the screen SC. In this case, the MCU 201 of the projector 2 changes the layout information stored in the RAM 203 according to the content of the layout change operation carried out in PC 1. The MCU 201 also transmits an output start command or output stop command to one PC 3 or a plurality of PCs 3. Specifically, on the basis of the layout information, the MCU 201 transmits an output start command to a PC 3 that has become an active PC anew, and transmits an output stop command to a PC 3 that has become a non-active PC anew.

In this embodiment, the first preview image has a smaller display area size than the second preview image, and the update frequency of the first preview image is lower than the update frequency of the second preview image. Therefore, even if the number of PCs 3 participating in the conference is large, the communication load is reduced, because the display area size of each of the first preview images is small and the update frequency thereof is low. The second preview image has a larger display area size than the first preview image, and the update frequency of the second preview image is higher than the update frequency of the first preview image. The second preview image is the preview image of the terminal designated by the user. Raising the update frequency thereof enhances the real-time property. Also, since the second preview image is acquired only from the terminal designated by the user, the communication load cannot be excessively large even though the display area size thereof is large.

Moreover, in this embodiment, if the newly acquired first preview image is not changed from the previously acquired preview image, the CPU 101 lowers the frequency of the update command. Thus, the communication load for displaying the first preview image is reduced. Meanwhile, if the newly acquired first preview image is changed from the previously acquired preview image, the CPU 101 raises the frequency of the update command. Thus, the real-time property of the first preview image is enhanced.

Embodiment 2

Explanation is given below, referring mainly to FIG. 7 and also to the other drawings including FIG. 6.

Figure 7:
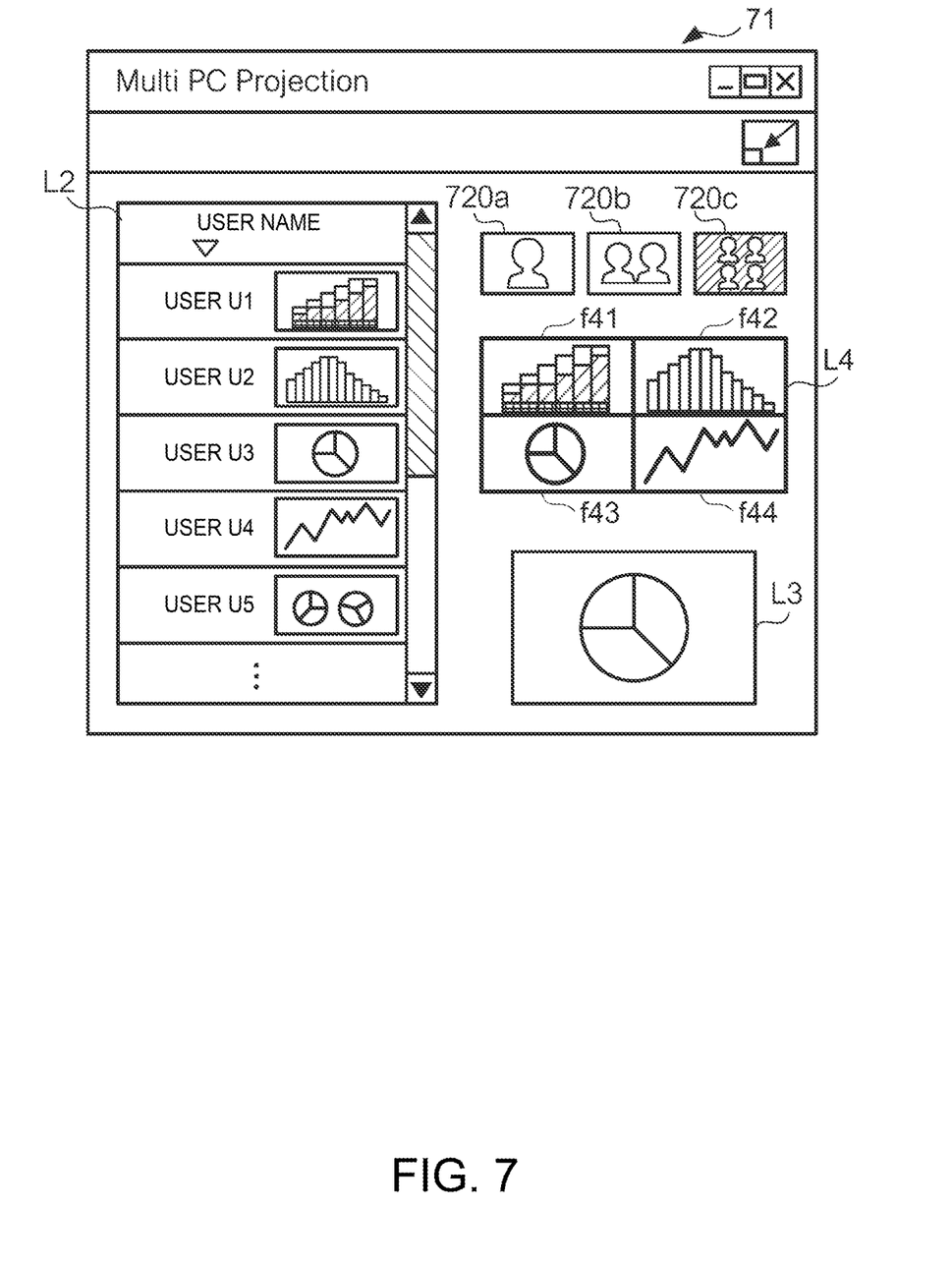
FIG. 7 illustrates an image showing a GUI for change according to Embodiment 2.

FIG. 7 illustrates an image showing a GUI for change according to Embodiment 2. In a GUI for change 71 according to this embodiment, the display content is partly different from the GUI for change 70 of Embodiment 1. Specifically, in the GUI for change 71, the layout area L1 in the GUI for change 70 (FIG. 6) is changed to a layout preview area L4. Also, as for the number of images change buttons 720, while the number of images change button 720b is selected in the GUI for change 70, the number of images change button 720c is selected in the GUI for change 71. The list display area L2 and the preview area L3 are the same as in Embodiment 1.

Since the number of images change button 720c of the number of images change buttons 720 is selected, the number of individual images 40 projected on the screen SC is four.

The layout preview area L4 is a screen image projected on the screen SC and has four division areas f4 (f41 to f44) corresponding to the four individual images 40. In the division areas f4, the preview images of the images displayed on the PCs 3 corresponding to the users Un selected in the list display area L2 are displayed. The display area size of each of the division areas f41 to f44 is larger than the preview image of each user Un displayed in the list display area L2.

In the example of FIG. 7, the preview image of the PC 3 corresponding to the user U1 is displayed in the division area f41. Similarly, the preview image of the PC 3 corresponding to the user U2 is displayed in the division area f42. The preview image of the PC 3 corresponding to the user U3 is displayed in the division area f43. The preview image of the PC 3 corresponding to the user U4 is displayed in the division area f44. In the layout area L1, the identifiers (user names or the like) of the PCs 3 are displayed, whereas in the layout preview area L4, the preview images of the image displayed on the PCs 3 are displayed.

In this embodiment, the preview images of the respective users Uz displayed in the layout preview area L4 (division areas f4) and the preview image displayed in the preview area L3 are equivalent to the second preview image. The preview images displayed in the list display area L2 are equivalent to the first preview image.

The preview images in the layout preview area L4 may be displayed by a measure that is similar to the measure for displaying the preview image in the preview area L3. Specifically, as the CPU 101 realizes the respective functions of the second acquisition unit 13, the display control unit 14, the command unit 15 and the switching unit 16 shown in FIG. 4, the preview image of a designated PC 3 (second preview image) is displayed in the layout preview area L4. Then, a command to update or a command about the "update frequency" of the preview images in the list display area L2 of a plurality of PCs 3 (first preview image) and the second preview image of the designated PC 3 is given to the PCs 3.

The layout preview area L4 may be configured to be able to switch the display with the layout area L1 via a toggle. For example, a double-click on the area of the layout preview area L4 may switch the display to the display of the layout area L1.

In this embodiment, the following effects can be achieved in addition to the effects of Embodiment 1. In the GUI for change 71, the list display area L2, the preview area L3 and the layout preview area L4 are formed on a single screen, and the screen image projected on the screen SC is displayed in the layout preview area L4. Also, since the frequency of updating the layout preview area L4 is controlled by the command unit 15, the screen image projected on the screen SC can be displayed in the layout preview area L4 with a high real-time property. Thus, when the user Uz using the PC 1 executes various operations such as an operation to select the PC 3 to project, there is less need to shift the eyes frequently between the screen SC and the screen on the PC 1. Thus, according to this embodiment, an information processing device with user operability improved further can be provided.

The program according to the invention may be stored in a recording medium. Using this recording medium, the program can be installed on a computer, for example. Here, the recording medium storing the program may be a non-temporary recording medium. The non-temporary recording medium may be, for example, a recording medium such as CD-ROM, though particularly limiting.

MODIFICATIONS

The invention is not limited to the above embodiments and can be carried out with various modifications. Several modifications will be described below. Of the modifications described below, two or more may be combined.

(1) Modification 1

In the description of the embodiments, the command unit 15 commands a plurality of PCs 3 to update the first preview image and the second preview image, thus acquiring the first preview image and the second preview image and controlling the update frequency thereof. However, the method for acquiring the first preview image or the second preview image and the method for controlling the update frequency thereof are not limited to this. For example, the command unit 15 may give a command about the "update frequency" to a plurality of PCs 3, instead of commanding the update of the first preview image or the second preview image. In this case, the plurality of PCs 3 spontaneously transmits the first preview image or the second preview image on the basis of the "update frequency" designated in the command. By controlling this "update frequency" command, the update frequency of the second preview image can be made higher than the update frequency of the first preview image. This can also apply to the following modifications.

(2) Modification 2

In the embodiments, in Step SA5 of FIG. 5, the CPU 101 determines whether the newly acquired first preview image is the same as the previously acquired first preview image. The determination method in Step SA5 of FIG. 5 is not limited to this. For example, the CPU 101 may determine whether the difference between the newly acquired first preview image and the previously acquired first preview image is smaller than a predetermined reference amount or not.

(3) Modification 3

In the embodiments, in Step SA6 of FIG. 5, the CPU 101 performs the processing to lower the frequency of the update command for the first preview image if the newly acquired first preview image is the same as the previously acquired first preview image. In contrast, the CPU 101 may not perform the processing of Step SA6. In this case, the CPU 101 does not change the frequency of the update command if the newly acquired first preview image has smaller change than a reference level, compared with the previously acquired first preview image. Meanwhile, if the change is equal to or greater than the reference level, the CPU 101 performs processing to raise the frequency of the update command.

(4) Modification 4

In the embodiments, in Step SA7 of FIG. 5, the CPU 101 performs the processing to raise the frequency of the update command for the first preview image if the newly acquired first preview image is not the same as the previously acquired first preview image. In contrast, the CPU 101 may not perform the processing of Step SA7. In this case, the CPU 101 lowers the frequency of the update command if the newly acquired first preview image has smaller change than a reference level, compared with the previously acquired first preview image. Meanwhile, if the change is equal to or greater than the reference level, the CPU 101 does not change the frequency of the update command.

(5) Modification 5

In the embodiments, the CPU 101 may output an update command for the first preview image at a predetermined interval and change the frequency of the update command for the first preview image at this interval. For example, in the case of outputting an update command for the first preview image every five seconds, when changing the frequency of the update command, the CPU 101 may change the output interval of the update command by every five seconds, such as to ten seconds, fifteen seconds and the like. For example, as the CPU 101 elongates the predetermined interval from five seconds to ten seconds, the frequency of the update command for the first preview image falls from twelve times to six times per minute. For example, as the PCU 101 shortens the predetermined interval from ten seconds to five seconds, the frequency of the update command for the first preview image rises from six times to twelve times per minute.

(6) Modification 6

In the embodiments, the CPU 101 may not acquire the first preview image from the PC 3 from which the second preview image is acquired.

(7) Modification 7

The processing performed by the PC 1 is not limited to the processing shown in FIG. 5.

(8) Modification 8

The hardware configuration of the PC 1 is not limited to the configuration shown in FIG. 2. The PC 1 may have any hardware configuration that can execute the processing of each step shown in FIG. 5. For example, a volatile storage device may be used instead of the ROM 102. Also, the hardware configuration of the projector 2 is not limited to the configuration shown in FIG. 3. For example, a volatile storage device may be used instead of the ROM 202. In an alternative example, the projector 2 may be configured with a system combining the liquid crystal panel 207 and a color wheel, a system using a digital mirror device (DMD), or a system combining a DMD and a color wheel, or the like.

(9) Modification 9

The configuration of the projection system PS is not limited to the configuration shown in FIG. 1. For example, it is possible that only the one PC 1 is connected to the projector 2 and that the PCs 3 are connected to this PC 1. In this case, the PC 1 connected to the projector 2 generates a combined image according to video signals outputted from the PCs 3 and outputs a video signal representing the generated combined image to the projector 2. Moreover, the video signals outputted from the PCs 3 may be analog signals.

(10) Modification 10

The information processing device to which the invention is applied is not limited to a personal computer. For example, the invention may be applied to a tablet terminal. Also, the image display device to which the information processing device according to the invention outputs a signal is not limited to the projector 2. The image display device may be any device that displays an image corresponding to a signal outputted from the information processing device, for example, a direct-view display device such as a liquid crystal display.

The connection between the PC 1 and PCs 3, and the projector 2, is not limited to wireless connection. The PC 1 and PCs 3, and the projector 2, may be wire-connected via an image signal cable and a USB (universal serial bus) cable or the like.

(11) Modification 11

In the embodiments, the command unit 15 commands a plurality of PCs 3 to update the first preview image and the second preview image. However, in this case, a plurality of commands may be outputted at different timings from each other. For example, in the case of updating the first preview images of ten PCs 3 at an interval of five seconds, update commands to the PCs 3 are outputted with a delay of 500 milliseconds from one PC to another. Thus, the first preview images received from the PCs 3 can be processed efficiently, enabling preview display with a high real-time property.

What is claimed is:

1. An information processing device comprising:
a communication unit which is controlled by at least one processor and which communicates with a plurality of terminals, each of the plurality of terminals outputting a video signal;
a first acquisition unit which acquires a first preview image from a first terminal of the plurality of terminals;
a second acquisition unit which acquires a second preview image having a larger display area size than the first preview image, from a designated terminal of the plurality of terminals; and
a display control unit which causes a display unit to display the first preview image and the second preview image on a single screen;
wherein
a frequency at which the second acquisition unit acquires the second preview image is higher than a frequency at which the first acquisition unit acquires the first preview image, and
when a newly acquired first preview image has a smaller change than a reference level, compared with a previously acquired first preview image, the frequency at which the first acquisition unit acquires the first preview image from the first terminal is decreased so as to lower a communication load on the information processing device, and
wherein the first acquisition unit and the second acquisition unit are each tangibly embodied as computer instructions stored on at least one non-transitory storage medium and executable by at least one processor.

2. The information processing device according to claim 1, wherein the frequency at which the first acquisition unit acquires the first preview image is a predetermined interval, and the frequency at which the first acquisition unit acquires the first preview image is decreased by elongating the predetermined interval.

3. The information processing device according to claim 1, wherein with respect to one terminal of the plurality of terminals, if a newly acquired first preview image has larger change than a reference level, compared with a previously acquired first preview image, the frequency at which the first acquisition unit acquires the first preview image rises.

4. The information processing device according to claim 3, wherein the frequency at which the first acquisition unit acquires the first preview image is a predetermined interval, and the frequency at which the first acquisition unit acquires the first preview image is raised by shortening the predetermined interval.

5. The information processing device according to claim 1, wherein the first acquisition unit does not acquire the first preview image from a terminal from which the second acquisition unit acquires the second preview image.

6. The information processing device according to claim 1, further comprising a command unit which commands the plurality of terminals to update the first preview image and the second preview image,
wherein a frequency at which the command unit commands update of the second preview image is higher than a frequency at which the command unit commands update of the first preview image.

7. The information processing device according to claim 1, further comprising a command unit which gives a command about an update frequency of the first preview image and the second preview image, to the plurality of terminals.

8. The information processing device according to claim 1, wherein in the case of acquiring the first preview image from at least two or more terminals of the plurality of terminals, the first acquisition unit varies the timing of acquiring the first preview image from the at least two or more terminals.

9. An information processing method comprising:
communicating with a plurality of terminals, each outputting a video signal;
acquiring a first preview image from a first terminal of the plurality of terminals;
acquiring a second preview image having a larger display area size than the first preview image, from a designated terminal of the plurality of terminals; and
causing a display unit to display the first preview image and the second preview image on a single screen;
wherein
a frequency of executing the acquisition of the second preview image is higher than a frequency of executing the acquisition of the first preview image, and
when a newly acquired first preview image has a smaller change than a reference level, compared with a previously acquired first preview image, the frequency at which the first preview image is acquired from the first terminal is decreased so as to lower a communication load.

10. A computer-readable non-temporary tangible storage medium in which a program is recorded, the program causing a computer to execute:
- communicating with a plurality of terminals, each outputting a video signal;
- acquiring a first preview image from a first terminal of the plurality of terminals;
- acquiring a second preview image having a larger display area size than the first preview image, from a designated terminal of the plurality of terminals; and
- causing a display unit to display the first preview image and the second preview image on a single screen;
- wherein
  - a frequency of executing the acquisition of the second preview image is higher than a frequency of executing the acquisition of the first preview image, and
  - when a newly acquired first preview image has a smaller change than a reference level, compared with a previously acquired first preview image, the frequency at which the first preview image is acquired from the first terminal is decreased so as to lower a communication load.

\* \* \* \* \*